United States Patent
Thill et al.

(10) Patent No.: US 10,810,476 B2
(45) Date of Patent: Oct. 20, 2020

(54) ELECTRONIC CIRCUIT FOR INTERCONNECTING A SMARTCARD CHIP

(75) Inventors: Michel Thill, Meudon (FR); Alain Pomet, Meudon (FR)

(73) Assignee: THALES DIS FRANCE SA, Meudon (FR)

(*) Notice: Subject to any disclaimer, the term of this patent is extended or adjusted under 35 U.S.C. 154(b) by 1028 days.

(21) Appl. No.: 13/387,792

(22) PCT Filed: Jul. 30, 2010

(86) PCT No.: PCT/EP2010/061147
§ 371 (c)(1),
(2), (4) Date: Jan. 30, 2012

(87) PCT Pub. No.: WO2011/015536
PCT Pub. Date: Feb. 10, 2011

(65) Prior Publication Data
US 2012/0131234 A1 May 24, 2012

(30) Foreign Application Priority Data
Aug. 5, 2009 (EP) .................................... 09305733

(51) Int. Cl.
*G06F 3/00* (2006.01)
*G06K 19/077* (2006.01)
(Continued)

(52) U.S. Cl.
CPC ....... *G06K 19/077* (2013.01); *G06K 7/10247* (2013.01); *G06K 19/07* (2013.01); *G06K 19/07733* (2013.01)

(58) Field of Classification Search
CPC .... G06F 13/40; G06K 7/10247; G06K 19/07; G06K 19/077; G06K 19/0773
(Continued)

(56) References Cited

U.S. PATENT DOCUMENTS 6,883,715 B1* 4/2005 Fruhauf ................ G06K 19/07
235/441
8,919,643 B2* 12/2014 Ashfield .............. G06Q 20/409
235/380
(Continued)

FOREIGN PATENT DOCUMENTS

DE 102007032373 A1 2/2008
EP 1801737 B1 6/2007

OTHER PUBLICATIONS http://blog.pcnews.ro/2008/03/25/the-worlds-first-thin-display-card-with-pki-chip/, "The world's first wafer-thin display card with PKI chip", Innovative Card Technologies, Mar. 25, 2008, p. 2 (Year: 2008).*

(Continued)

*Primary Examiner* — Idriss N Alrobaye
*Assistant Examiner* — Brooke J Taylor
(74) *Attorney, Agent, or Firm* — The Jansson Firm; Pehr B. Jansson

(57) ABSTRACT

The invention relates to an electronic circuit for interconnecting a smartcard chip with a peripheral device, comprising: —a dedicated communication interface adapted to communicate with a smartcard chip; —a configurable communication interface adapted to communicate with a peripheral device; —a configuration module adapted to receive on said dedicated communication interface a request for configuring the configurable communication interface, adapted to configure the communication protocol of the configurable communication interface with the peripheral device based on the received request; —a bridging module adapted for converting data exchanged between the peripheral device and the smartcard chip through the dedicated communication interface and the configurable communication interface.

21 Claims, 1 Drawing Sheet

(51) Int. Cl.
*G06K 7/10* (2006.01)
*G06K 19/07* (2006.01)

(58) Field of Classification Search
USPC .......................................................... 710/13
See application file for complete search history.

(56) References Cited

U.S. PATENT DOCUMENTS

| | | | |
|---|---|---|---|
| 9,251,637 B2* | 2/2016 | Ashfield | G06Q 20/24 |
| 2004/0049623 A1 | 3/2004 | Barnett et al. | |
| 2005/0005045 A1 | 1/2005 | Kim et al. | |
| 2005/0077355 A1 | 4/2005 | Yamamoto et al. | |
| 2005/0240528 A1* | 10/2005 | Hendrick | G06Q 20/346 |
| | | | 705/44 |
| 2006/0242698 A1* | 10/2006 | Inskeep | G06Q 20/385 |
| | | | 726/20 |
| 2008/0006704 A1* | 1/2008 | Kim | 235/492 |
| 2008/0099556 A1 | 5/2008 | Park | |
| 2008/0110983 A1* | 5/2008 | Ashfield | G06Q 20/40975 |
| | | | 235/382 |
| 2008/0149734 A1* | 6/2008 | Musial | G06K 19/077 |
| | | | 235/492 |
| 2010/0312926 A1* | 12/2010 | Arya | H04M 1/72527 |
| | | | 710/51 |

OTHER PUBLICATIONS

PCT/EP2010/061147 International Search Report, dated Oct. 15, 2010, European Patent Office, P.B.5818 Patentlaan 2 NL—2280 HV Rijswijk.

* cited by examiner

ELECTRONIC CIRCUIT FOR INTERCONNECTING A SMARTCARD CHIP

BACKGROUND

1. Field of the Invention

The present invention generally relates to smartcards, and more particularly relates to the control of peripheral devices by smartcards.

2. Description of the Related Art

Smart cards are plastic cards having an embedded smartcard chip. A smartcard chip is an integrated microcontroller generally comprising a central processing unit, a random access memory, a ROM memory and an EEPROM memory.

Smartcard readers have to be recognized by an infrastructure prior to perform any transaction involving a smartcard. The infrastructure is running an application in which the smartcard is involved. The smartcard reader expects a smartcard. The half duplex protocol between the smartcard and the smartcard reader, in which, either the smartcard sends information to the smartcard reader or vice versa, cannot start until a smartcard is detected in place into the smartcard reader. The infrastructure manages authentication or transactions for instance for pre-paid cards in public telephony, for Automatic Teller Machines, for pay television providers in set top boxes and for wireless telecom operators or in Global System for Mobile terminals. Except for SIM cards, all other applications use a physical sensor to detect the smartcard. This sensor tells the smartcard reader when a smartcard is in place that is when the smartcard lead frame contacts are able to mate with the smartcard reader contacts. When the smartcard reader has established that a smartcard is in place the power up sequence can start at the smartcard reader convenience. After the power up sequence, the smartcard reader will firstly provide a clock signal to the smartcard and will then release its reset signal. The smartcard is then able to execute the stored Operating System.

A whole new market for the smartcard is now emerging with the Internet access from a Personnel Computer. Secure message, Public Key Infrastructure, Authentication and Electronic Payment are the new smartcard applications. The smartcard can be an e-commerce facilitator. The differentiation of the smartcard compared to other solutions relies on the PIN in the memory that is never communicated in any transaction.

Initially, smartcard chips had limited processing resources. Their only communication interface was an interface according to ISO 7816. The ISO 7816 interface provides electrical contacts for communications with a smartcard reader. Such a smartcard chip exchanges data in slave mode with a master smartcard reader.

Due to their reduced dimensions and to their ciphering capacities, smartcards are used in an increasing number of applications requesting a user authentication. Smartcards can notably be used as web servers. Their resources are thereby constantly increased. SIM cards with a 256 Ko RAM size and a 32 bits processor are now commercialized. For multimedia applications, smartcards with up to 256 Mo RAM size are commercialized.

Such smartcards have the capacity to handle far more applications than what they were initially designed for. In this context, smartcard manufacturers intend to interface smartcards with various kinds of peripheral devices. Smartcard manufacturers intend to distribute smartcards integrating or communicating with peripheral devices like a Flash memory, a keypad, a LCD display, MEMS devices, a biometric sensor, or an accelerometer.

To allow the smartcard chip to communicate with peripheral devices, the ISO 7816 interface is not suitable. Therefore, smartcard chips providing a SWP (for Single Wire Protocol, whose physical layer is defined in the ETSI standard TS 102.613) or a USB interface are currently developed. The document U.S. Pat. No. 6,883,715 notably discloses a smartcard able to switch between an ISO communication mode and a non-ISO communication mode (USB protocol).

However, such a smartcard is not adapted for communicating with a wide variety of peripheral devices since the additional interface is not necessarily the suitable interface for all peripheral devices. A smartcard supporting communications with a large variety of peripheral devices leads manufacturers to design smartcards having smartcard chips connected to specific interfaces. Such a design involves major modifications of the smartcard chip architecture, which induces huge costs on the manufacturing process of millions of chips. Such chips are practically much too expensive to satisfy the market expectations.

For instance, a smartcard chip provided with a USB interface faces several design problems. USB is basically intended to support data transfers. The USB interface has to work both as a host and as a device with the peripherals. Such a design induces a significant increase of the chip area and a significant increase of its complexity and price. To keep a similar chip size, all the chip design has to be adapted. Moreover, there is currently no standard for setting the design of a host USB standard of a chip.

Thus, there is a need for an electronic circuit or a smartcard solving one of these drawbacks.

SUMMARY OF THE INVENTION

The invention proposes an electronic circuit for interconnecting a smartcard chip with a peripheral device, comprising:
- a dedicated communication interface adapted to communicate with a smartcard chip;
- a configurable communication interface adapted to communicate with a peripheral device;
- a configuration module adapted to receive on said dedicated communication interface a request for configuring the configurable communication interface, adapted to configure the communication protocol of the configurable communication interface with the peripheral device based on the received request;
- a bridging module adapted for converting data exchanged between the peripheral device and the smartcard chip through the dedicated communication interface and the configurable communication interface.

According to an embodiment, said dedicated communication interface is not configurable.

According to another embodiment, said dedicated communication interface complies with the Single Wire Protocol standard.

According to another embodiment, the electronic circuit is adapted to run as a slave peripheral of the smartcard chip during the configuration of the communication protocol.

According to another embodiment, the configurable communication interface comprises several electrical contacts to be connected to a peripheral device, and during the configuration of the communication protocol, the configuration module is adapted to set the voltage levels applied on these electrical contacts.

According to another embodiment, the configuration module is adapted to configure the data conversion function of the bridging module.

According to another embodiment, said dedicated communication interface is a serial communication interface.

According to another embodiment, the configuration module is adapted to switch the dedicated communication interface between a master and a slave mode further to a configuration request received on this dedicated communication interface.

The invention also relates to a set of devices including:
an electronic circuit as recited above;
a peripheral connected to the configurable communication interface of the electronic circuit;
a smartcard connected to the dedicated communication interface of the electronic circuit.

The invention further relates to a smartcard comprising an electronic circuit as recited above, further comprising an embedded peripheral connected to the configurable communication interface and a smartcard chip connected to the dedicated communication interface.

BRIEF DESCRIPTION OF THE DRAWINGS

The advantage of the present invention will become apparent from the following description of several embodiments with reference to the accompanying drawings, in which.

DETAILED DESCRIPTION

The invention proposes an electronic circuit for interconnecting a smartcard chip with a peripheral device. The electronic circuit includes a configurable communication interface for communicating with a peripheral device. The electronic circuit also includes a dedicated communication interface for communicating with a smartcard chip and for receiving a configuration request for the configurable communication interface. Based on a configuration request, a configuration module configures the communication protocol of the configurable communication interface with the peripheral device.

Thanks to the invention, a smartcard can communicate with a wide variety of peripheral devices, without requesting a multiplication of specific interfaces of its smartcard chip. The smartcard can thereby be interfaced with peripherals without requesting changes of its smartcard chip architecture. Very standardized smartcard chips can thus be used. When peripherals are included in the smartcard itself, the design of the smartcard is made much easier and simply requires configuring the configurable communication interface of the electronic circuit. Different configurations of a given electronic circuit allow using a common electronic circuit and smartcard chip for different series of smartcards including different peripherals.

Figure 1:
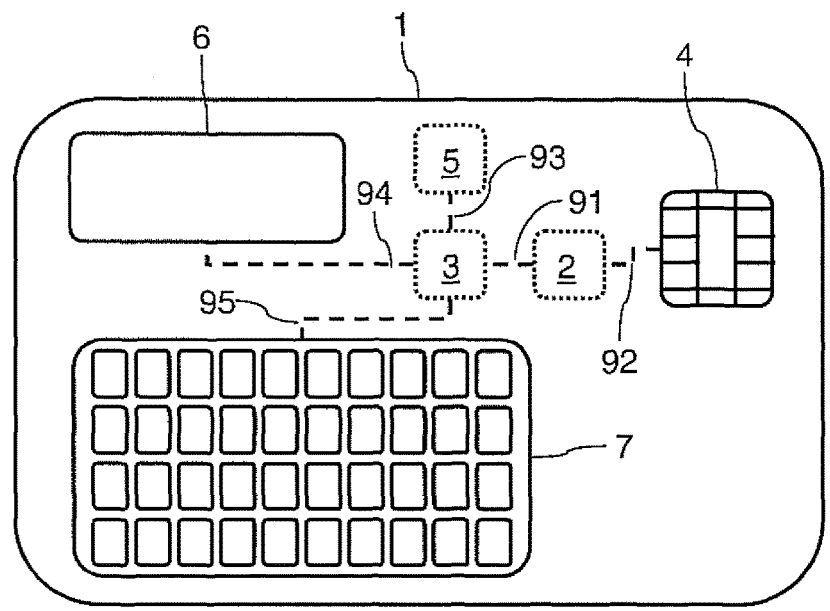
FIG. 1 is a schematic view of a smartcard according to the invention.

FIG. 1 is a schematic view of a super smartcard 1 according to an embodiment of the invention. A super smartcard, introduced in the late 1980s is a smart card that includes a keypad and a display. One recent example super smartcard was introduced by Innovative Card Technologies and eMue Technologies. http://www*gizmag*com/go/8231/, accessed Nov. 26, 2013 (to avoid working hypertext links in the patent application and any publications thereof, applicants provide asterisks instead of periods; to create a working hyperlink, the asterisks should be replaced with periods). The super smartcard 1 is made of plastic and has a contact interface 4 provided with a plurality of electrical contacts or pads on its outer surface. These electrical contacts are the external interface for a smartcard chip 2, typically located beneath these electrical contacts. The smartcard chip 2 is connected to the contact interface 4 through connection wires 92.

An electronic circuit 3 is embedded in super smartcard 1. The electronic circuit 3 is connected to the smartcard chip 2 through connection wires 91. The electronic circuit 3 includes a dedicated interface for communicating with the smartcard chip 2. The super smartcard 1 also includes peripherals 5, 6 and 7. The illustrated peripheral 5 is an EEPROM memory used to store a large amount of user data. The illustrated peripheral 6 is a digital display, such as a LCD display for displaying information to the user. The illustrated peripheral 7 is a small-size keyboard or keypad with which the user can input data. Peripherals 5 to 7 are connected to the electronic circuit 3 through connection wires 93 to 95 respectively. The electronic circuit 3 is provided with configurable communication interfaces for communicating with peripherals 5 to 7. Peripherals 5, 6 and 7, the smartcard chip 2 and the electronic circuit 3 are powered by a smartcard reader through the contact interface 4.

Figure 2:
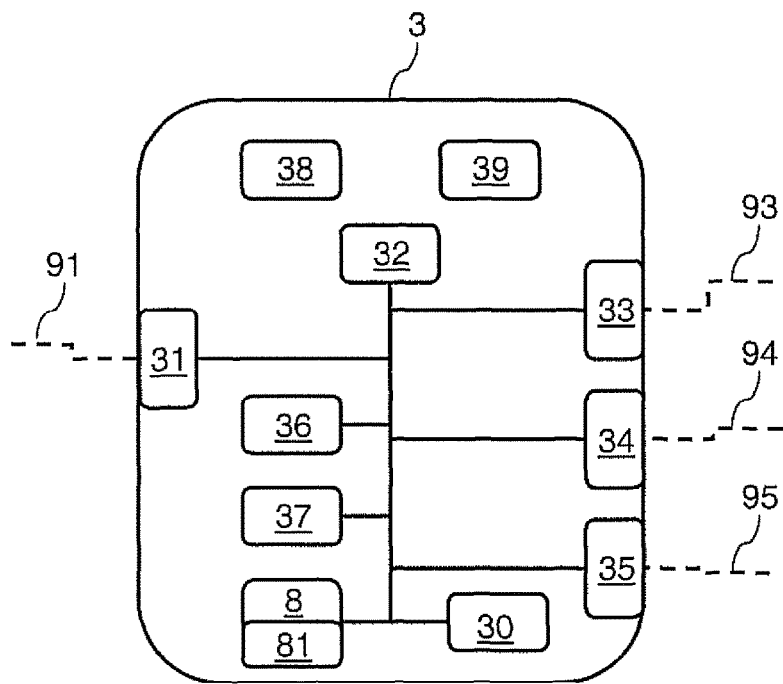
FIG. 2 is a schematic view of the architecture of an electronic circuit according to the invention.

FIG. 2 is a schematic view of the architecture of the electronic circuit 3. The electronic circuit 3 includes a clock management unit 38 and a power management unit 39. The electronic circuit 3 also includes a processing unit 32 for executing several software functions. The electronic circuit 3 further includes a RAM memory 36, a ROM memory 37, an EEPROM 30 and a Master/Slave switching module. ROM memory 37 can store the operating system of the electronic circuit 3. The operating system is run by the processing unit 32. The EEPROM 30 can store the configurations of the configurable communication interfaces 33 to 35.

The dedicated communication interface 31 is designed to communicate with the smartcard chip 2 using only one kind of communication protocol. The dedicated communication interface 31 is advantageously not configurable: its signal voltage Level (or any other appropriate signal modulation), its electrical contacts attribution and its communication protocol cannot be modified by external requests.

The configurable interfaces 33 to 35 are connected to the connection wires 93 to 95 respectively. During a configuration of the interfaces 33 to 35, the voltage levels and the communication protocols used to communicate on the connection wires 93 to 95 are set.

Instead of providing the electronic circuit 3 with a specific interface for the configuration of the interfaces 33 to 35, the dedicated communication interface 31 is used. The configuration process is carried out as follows. The smartcard 1 is initially booted. A configuration request is applied on the dedicated communication interface 31 through the smartcard chip 2 in order to trigger the configuration process. During 30 the configuration process, the smartcard chip 2 runs in master mode and the electronic circuit 3 runs in slave mode. The configuration request includes configuration settings and is processed by the processing unit 32. The voltage levels, each connection wire function and the communication protocols used to communicate on the connection wires 93 to 95 are then set. The configuration settings for interfaces 33 to 35 are stored in the EEPROM memory 30. The configuration settings are thus available for the next boot of the smartcard 1. The configuration also sets the conversion of the communication between the dedicated communication interface 31 and the configurable interfaces 33 to 35. During the configuration, conversion software or settings are loaded into the electronic circuit 3. By running the loaded software, the processing unit 32 can thus convert the data exchanged between the peripherals and the smartcard chip 2.

The electronic circuit 3 also includes a master/slave switching unit 8 managing the communication mode of the dedicated communication interface 31. According to the type of the peripheral to be interfaced with the smartcard chip 2, the master/slave switching unit 8 will functionally run the dedicated communication interface 31 either in slave or master mode. For data to be displayed on the LCD display 6, the dedicated communication interface 31 is run in slave mode. For data input on the keypad 7, the dedicated communication interface 31 is run in master mode to forward the input data to the smartcard chip 2. The master/slave switching unit 8 includes a RAM buffer 81.

A configuration request received by the electronic circuit 3 from the smartcard chip 2 can also be processed to control the switching of the master/slave mode of the dedicated communication interface 31 by the switching/unit 8.

The dedicated communication interface 31 preferably complies with the SWP standard. The SWP standard provides a two-way simultaneous (full-duplex) digital communication. The SWP standard is based on the use of two different physical and electrical quantities, i.e. a voltage and an electric current. A master transmitter is connected to one slave transmitter by a single active connection wire. The master transmitter and the slave transmitter have a common reference. The master transmitter transmits a master signal to the slave transmitter and the slave transmitter transmits a slave signal to the master transmitter. The master signal is a digital modulation in voltage and the slave signal is a digital modulation in current. The master signal comprises a transmission clock and data. Power can be transmitted through the active connection wire. SWP is particularly suitable for systems with limited energy and physical connection means. SWP is also very advantageous for the highly-standardized environment and the rationalized interconnections of a smartcard. According to the SWP standard, the smartcard chip remains physically master of the communication with other devices. However, the smartcard chip 2 can be switched functionally as a slave of the electronic circuit 3.

The configurable communication interfaces 33 to 35 can be configured to comply with other communication protocols. Serial communication protocols compliant with the following standards can notably be configured: SPI, I2C, GPIO, UART . . . . The most appropriate communication protocol will be configured on a configurable communication interface according to the type of peripheral to which it has to be connected.

In the embodiments disclosed previously, the electronic circuit is embedded in the smartcard. However, the invention also covers embodiments where the electronic circuit is located outside of the smartcard. The electronic circuit can notably be located in a smartcard reader and communicate with the smartcard chip through a reader interface. The communication between the smartcard and the electronic circuit can be established through smartcard surface contacts not attributed to the ISO communication. Peripheral devices can be connected to a configurable interface of the smartcard reader or to an interface of another device connected to the smartcard reader, such as a mobile phone. Thus, small size smartcards such as SIM cards can also be easily interfaced with external peripherals.

The peripherals disclosed previously to be interfaced with the smartcard chip are a keypad, an LCD display and an EEPROM memory. Obviously, many other kinds of peripherals can be interfaced with the smartcard chip according to the invention. Such peripherals can notably be GPS detectors, RF circuits, biometric sensors, accelerometers or other MEMS structures.

The invention claimed is:

1. An electronic circuit for interconnecting a smartcard chip with a peripheral device, comprising:
    a dedicated communication interface adapted to communicate with a smartcard chip according to a first communication protocol;
    a configurable communication interface, comprising a plurality of electrical contacts connectable to said peripheral device for communicating with said peripheral device according to a second communication protocol selectable among several communication protocols, and being configurable according to configuration settings among a group of configuration settings stored in a memory of said electronic circuit, wherein said configuration settings comprise an attribution of said electrical contacts, signal voltage levels applied on said electrical contacts, a communication protocol among said several communication protocols, and a conversion between the first communication protocol and the second communication protocol;
    a processing unit adapted to receive on said dedicated communication interface a request comprising configuration settings for configuring the configurable communication interface, adapted to set the configurations of the configurable communication interface based on the received request by setting the attribution of said electrical contacts, the signal voltage levels applied on said electrical contacts, the second communication protocol to communicate on said electrical contacts, and the conversions between the first communication protocol and the second communication protocol; and
    the processing unit further adapted for converting data exchanged between the peripheral device and the smartcard chip through the dedicated communication interface and the configurable communication interface using said set conversions.

2. The electronic circuit according to claim 1, wherein said dedicated communication interface is not configurable.

3. The electronic circuit according to claim 1, wherein said dedicated communication interface complies with the Single Wire Protocol standard.

4. The electronic circuit according to claim 1, wherein the electronic circuit is adapted to run as a slave peripheral of the smartcard chip during the configuration of the communication protocol.

5. The electronic circuit according to claim 1, wherein the configurable communication interface comprises several electrical contacts to be connected to a peripheral device, and wherein, during the configuration of the communication protocol, the processing unit is adapted to set the voltage levels applied on these electrical contacts.

6. The electronic circuit according to claim 1, wherein said dedicated communication interface is a serial communication interface.

7. The electronic circuit according to claim 1, wherein the processing unit is adapted to switch the dedicated communication interface between a master and a slave mode further to a configuration request received on this dedicated communication interface.

8. A system of devices comprising:
an electronic circuit for interconnecting a smartcard chip with a peripheral device having:
  a dedicated communication interface adapted to communicate with a smartcard chip according to a first communication protocol;
  a configurable communication interface, comprising a plurality of electrical contacts connectable to said peripheral device for communicating with said peripheral device according to a second communication protocol selectable among several communication protocols, and being configurable according to configuration settings among a group of configuration settings stored in a memory of said electronic circuit, wherein said configuration settings comprise an attribution of said electrical contacts, signal voltage levels applied on said electrical contacts, a communication protocol among said several communication protocols, and a conversion between the first communication protocol and the second communication protocol;
  a processing unit adapted to receive on said dedicated communication interface a request comprising configuration settings for configuring the configurable communication interface, adapted to set the configurations of the configurable communication interface with the peripheral device based on the received request by setting the attribution of said electrical contacts, the signal voltage levels applied on said electrical contacts, the second communication protocol to communicate on said electrical contacts, and the conversions between the first communication protocol and the second communication protocol; and
  the processing unit adapted for converting data exchanged between the peripheral device and the smartcard chip through the dedicated communication interface and the configurable communication interface using said set conversions;
a peripheral connected to the configurable communication interface of the electronic circuit;
a smartcard connected to the dedicated communication interface of the electronic circuit.

9. A smartcard comprising an electronic circuit a dedicated communication interface adapted to communicate with a smartcard chip;
  a configurable communication interface, comprising a plurality of electrical contacts connectable to said peripheral device for communicating with said peripheral device according to a second communication protocol selectable among several communication protocols, and being configurable according to configuration settings among a group of configuration settings stored in a memory of said electronic circuit, wherein said configuration settings comprise an attribution of said electrical contacts, signal voltage levels applied on said electrical contacts, a communication protocol among said several communication protocols, and a conversion between the first communication protocol and the second communication protocol;
  a processing unit adapted to receive on said dedicated communication interface a request comprising configuration settings for configuring the configurable communication interface, adapted to set the configurations of the configurable communication interface based on the received request by setting the attribution of said electrical contacts, the signal voltage levels applied on said electrical contacts, the second communication protocol to communicate on said electrical contacts, and the conversions between the first communication protocol and the second communication protocol;
  the processing unit further adapted for converting data exchanged between the peripheral device and the smartcard chip through the dedicated communication interface and the configurable communication interface using said set conversions; and
  an embedded peripheral connected to the configurable communication interface and a smartcard chip connected to the dedicated communication interface.

10. The system of devices of claim 8 wherein the dedicated communication interface of the electronic circuit is not configurable.

11. The system of devices of claim 8 wherein the dedicated communication interface of the electronic circuit complies with the Single Wire Protocol standard.

12. The system of devices of claim 8 wherein the electronic circuit is adapted to run as a slave peripheral of the smartcard chip during the configuration of the communication protocol.

13. The system of devices of claim 8 wherein the configurable communication interface of the electronic circuit comprises several electrical contacts to be connected to a peripheral device, and wherein, during the configuration of the communication protocol, the processing unit is adapted to set the voltage levels applied on these electrical contacts.

14. The system of devices of claim 8 wherein the dedicated communication interface of the electronic circuit is a serial communication interface.

15. The system of devices of claim 8 wherein the configuration module of the electronic circuit is adapted to switch the dedicated communication interface between
  a master and a slave mode further to a configuration request received on this dedicated communication interface.

16. The smartcard of claim 9 wherein the dedicated communication interface of the electronic circuit is not configurable.

17. The smartcard of claim 9 wherein the dedicated communication interface of the electronic circuit complies with the Single Wire Protocol standard.

18. The smartcard of claim 9 wherein the electronic circuit is adapted to run as a slave peripheral of the smartcard chip during the configuration of the communication protocol.

19. The smartcard of claim 9 wherein the configurable communication interface of the electronic circuit comprises several electrical contacts to be connected to a peripheral device, and wherein, during the configuration of the communication protocol, the processing unit is adapted to set the voltage levels applied on these electrical contacts.

20. The smartcard of claim 9 wherein the dedicated communication interface of the electronic circuit is a serial communication interface.

21. The smartcard of claim 9 wherein the configuration module of the electronic circuit is adapted to switch the dedicated communication interface between
  a master and a slave mode further to a configuration request received on this dedicated communication interface.

* * * * *